Patented June 7, 1949

2,472,356

UNITED STATES PATENT OFFICE 2,472,356

4:7-DICHLORO-(2:1) - NAPHTHINDOLE - 2:2'-(2':1')-NAPHTHATHIONAPHTHENE INDIGO

Donald Graham Wilkinson, Blackley, Manchester, England, assignor to Imperial Chemical Industries Limited, a corporation of Great Britain No Drawing. Application December 4, 1947, Serial No. 789,759. In Great Britain December 4, 1946

2 Claims. (Cl. 260—322)

This invention relates to 4:7-dichloro-(2:1)-naphthindole - 2:2' - (2':1') - naphthathionaphthene indigo and more particularly to a process for the manufacture of a new brown dyestuff of the thioindigoid series.

It is known that dyestuffs of the thioindigoid series can be made by condensing a halogenated naphthisatin with a thioindoxyl but according to my experiments the known brown dyestuffs obtained in this way suffer from the serious disadvantage that the tone of the shade obtained on textile materials varies considerably with the nature and severity of the subsequent soaping treatment.

I have now found that the new brown dyestuff obtained by reacting 4:7-dichloro-(2:1)-naphthisatin with (2:1)-naphthathioindoxyl does not suffer from this disadvantage. The new dyestuff thus obtained is 4:7-dichloro-(2:1)-naphthindole-2:2'-(2':1')-naphthathionaphthene indigo and has the formula:

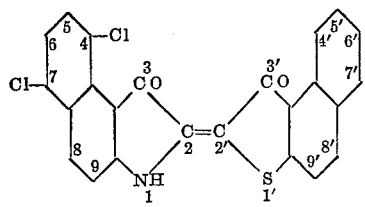

According to my invention therefore I provide a process for the manufacture of a new brown dyestuff which comprises reacting 4:7-dichloro-(2:1)-naphthisatin with (2:1)-naphthathioindoxyl in the presence of a nitrogenous base.

As an example of a suitable nitrogenous base for use in the invention there may be mentioned piperidine.

The reaction is conveniently carried out by heating the reagents together in an inert organic solvent such as for example chlorobenzene.

The dark brown dyestuff which separates from the reaction mixture may be isolated by filtering the reaction mixture, washing with a suitable volatile organic liquid such as for example benzene and drying.

The new dyestuff gives full dark brown shades of excellent fastness to washing and to light when dyed or printed on cotton or viscose. It is superior to other brown dyestuffs of this series in that the tone of the shade is comparatively unsusceptible to varying conditions of soaping.

The invention is illustrated but not limited by the following example in which the parts are by weight.

*Example*

An intimate mixture of 60 parts of 4:7-dichloro-(2:1)-naphthisatin and 45 parts of (2:1)-naphthathioindoxyl is added to a solution of 19.3 parts of piperidine in 1100 parts of chlorobenzene, and the whole stirred and boiled for 1 hour. The dark brown dyestuff which separates is filtered off, washed with benzene and dried.

The 4:7-dichloro-(2:1)-naphthisatin (M. P. 315–320° C.) is prepared by Sandmeyer's chloral oxime synthesis (Helvetica Chimica Acta, 1919, 2, 234) from 5:8-dichloro-2-naphthylamine.

I claim:
1. The new dyestuff 4:7-dichloro-(2:1)-naphthindole - 2:2' - (2':1') - naphthathionaphthene indigo.
2. Process for the manufacture of a new brown dyestuff which comprises reacting 4:7-dichloro-(2:1)-naphthisatin with (2:1)-naphthathioindoxyl in the presence of piperidine.

DONALD GRAHAM WILKINSON.

REFERENCES CITED

The following references are of record in the file of this patent:

UNITED STATES PATENTS

| Number | Name | Date |
|---|---|---|
| 1,434,983 | Bauer et al. | Nov. 7, 1922 |
| 1,983,888 | Zerweck et al. | Dec. 11, 1934 |